(12) United States Patent
Van Veen

(10) Patent No.: US 8,132,644 B2
(45) Date of Patent: Mar. 13, 2012

(54) METHOD AND APPARATUS FOR THE REDUCTION OF SOUND

(75) Inventor: Theo Antoon Van Veen, Schiedam (NL)

(73) Assignee: Stichting Nationaal Lucht-En Ruimtevaart Laboratorium, Amsterdam (NL)

( * ) Notice: Subject to any disclaimer, the term of this patent is extended or adjusted under 35 U.S.C. 154(b) by 0 days.

(21) Appl. No.: 12/905,476

(22) Filed: Oct. 15, 2010

(65) Prior Publication Data

US 2011/0083925 A1 Apr. 14, 2011

Related U.S. Application Data

(63) Continuation of application No. PCT/EP2008/054668, filed on Apr. 17, 2008.

(51) Int. Cl.
*B64F 1/26* (2006.01)
(52) U.S. Cl. .......... 181/210; 181/295; 181/296; 244/1 N
(58) Field of Classification Search .................. 181/210, 181/295, 296; 244/1 N
See application file for complete search history.

(56) References Cited

U.S. PATENT DOCUMENTS

| | | | |
|---|---|---|---|
| 2,502,016 A | 3/1950 | Olson | |
| 4,244,439 A * | 1/1981 | Wested | 181/210 |
| 7,637,062 B2 * | 12/2009 | Rerup | 52/144 |
| 2001/0030079 A1 | 10/2001 | Ryan et al. | |
| 2005/0103568 A1 * | 5/2005 | Sapoval et al. | 181/293 |
| 2005/0194205 A1 | 9/2005 | Guo | |
| 2005/0263346 A1 | 12/2005 | Nishimura | |
| 2007/0151797 A1 * | 7/2007 | Roark et al. | 181/210 |
| 2009/0065299 A1 * | 3/2009 | Vito et al. | 181/294 |

FOREIGN PATENT DOCUMENTS

| | | |
|---|---|---|
| DE | 2834683 | 10/1979 |
| GB | 2351770 | 1/2001 |
| JP | 55009971 | 1/1980 |
| WO | WO 2004013427 | 2/2004 |

OTHER PUBLICATIONS

Official Search Report of the European Patent Office in counterpart foreign application No. PCT/EP2008/054668 filed Apr. 17, 2008.
Written Opinion of the European Patent Office in counterpart foreign application No. PCT/EP2008/054668 filed Apr. 17, 2008.

* cited by examiner

Primary Examiner — Forrest M Phillips
(74) Attorney, Agent, or Firm — Steven M. Koehler; Westman, Champlin & Kelly, P.A.

(57) ABSTRACT

A method and apparatus for the reduction of sound travelling in a wave-guide in the air above the ground is presented, comprising the provision below the ground of at least a top layer which, at the interface of the top layer and air, has an acoustic impedance which substantially matches the acoustic impedance of the air. Also a cylindrical structure with holes can be used. The method and apparatus may be used for the reduction of aircraft sounds, especially in the range of 15 Hz to 40 Hz, during the first part of take-off, wherein said layer(s) below the ground are provided in a range starting at a lateral side of the runway and extending until at least 100 meters, preferably until at least 300 meters and more preferably until at least 500 meters, from the runway.

25 Claims, 1 Drawing Sheet

METHOD AND APPARATUS FOR THE REDUCTION OF SOUND

CROSS-REFERENCE TO RELATED APPLICATION

This application claims priority under 35 U.S.C. 120 of International Application PCT/EP2008/054668 filed Apr. 17, 2008 and published as WO 2009/127258 in English, the content of which is incorporated herein by reference in its entirety.

BACKGROUND

The discussion below is merely provided for general background information and is not intended to be used as an aid in determining the scope of the claimed subject matter.

Aspects of the invention relate to a method for the reduction of sound travelling in a wave-guide located in the air above the ground.

Under specific circumstances noise, for example air-craft noise during the first part of take-off when the air-craft is gaining speed at a runway, can be very disturbing at a great distance from the source of the noise. This especially applies for sound frequencies in the range from 15 Hz to 40 Hz. In the above example of aircraft noise an increase of low frequency noise above all occurs when the aircraft still has contact with the runway, and runs its engines at high power, whereas further the wind conditions are such that the wind is blowing substantially towards an area of interest (the area suffering from the disturbing noise) with the right (vertical) wind gradient. Other factors which may be of influence are, among others, the (vertical) temperature gradient and/or a combination of wind and temperature gradients.

Under such conditions a situation may be created in which noise emanating from the source of noise in a specific range of angles will propagate above the ground in a so-called waveguide between the ground surface and a virtual upper limit. Sound waves will successively reflect downwards at the upper limit due to the (vertical) gradient (the effective speed of sound increases with altitude) in the sound speed caused by the summation of the effects of wind gradient and temperature gradient, and upon reaching the ground surface will reflect upwards again, and so on. Basically the reflection at the ground surface is a result of an acoustic impedance boundary present at the ground.

The above wave-guide effect especially occurs in a range of sound frequencies from about 15 Hz to about 40 Hz. The sound propagating through this wave-guide is less attenuated during propagation in comparison to the attenuation that occurs with spherical propagation of sound.

State of the art attempts to reduce disturbing noise substantially comprise structures such as shields, hills, trees and vegetation located between the source of noise and the area of interest. When applied for reducing noise from aircraft at an airfield, such known structures are not compatible with safety requirements calling for free, unobstructed areas alongside the runway. Moreover such structures only are effective in reducing high frequency noise, whereas noise in the above range of 15 Hz to 40 Hz hardly is reduced.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the invention is a method for the reduction of sound travelling in a wave-guide in the air above the ground (earth ground or other support structure such as an aircraft carrier), comprising providing below (in or on) the ground at least a top layer which, at the interface of the top layer and air, has an acoustic impedance which substantially matches the acoustic impedance of the air.

Another aspect of the invention is an apparatus for the reduction of sound travelling in a wave-guide in the air above the ground, comprising at least a top layer in or on the ground which, at the interface of the top layer and air, has an acoustic impedance which substantially matches the acoustic impedance of the air. The afore-mentioned layer is particularly advantageous when disposed adjacent a runway of an airport, thereby comprising additional aspects of the invention.

DETAILED DESCRIPTION OF THE ILLUSTRATIVE EMBODIMENT

In accordance with aspects of the present invention, a method and apparatus comprises the provision below the ground of at least a top layer which, at the interface of the top layer and air, has an effective acoustic impedance which substantially matches the acoustic impedance of the air (FIG. 1: ground 1, a top layer 2 and a runway 3 which optionally may be integrated in an aircraft carrier of which ground 1 is the deck structure).

As a result the ground surface no longer acts as an acoustically 'hard' surface which reflects the sound upwards. Because of the improved impedance match between the air and the adjoining top layer 2 of the ground 1 the sound now can enter the ground 1 where it is propagated and thus absorbed by means of different mechanisms. For example an excitation of the ground structure or apparatus 2 may be caused which absorbs the sound energy; or a coupling to pores in the ground filled with air may be caused. For the lower frequencies mentioned above the former mechanism is expected to be the most practical.

In an embodiment of the method, water is excluded as much as possible from said at least one top layer 2. Such a measure is effective in improving the air to ground coupling (impedance matching). When there is much water in the ground, the ground reflection and thus the wave-guide for ground waves is more pronounced (as can be seen in the difference between summer and winter: in summertime less sound energy is reflected by the acoustically softer ground).

A positive side-effect of providing a significant reduction of water at the surface is a substantial reduction of the possibility for the creation of local fog which is an important gain for the safety and capacity of an airport.

Figure 2:
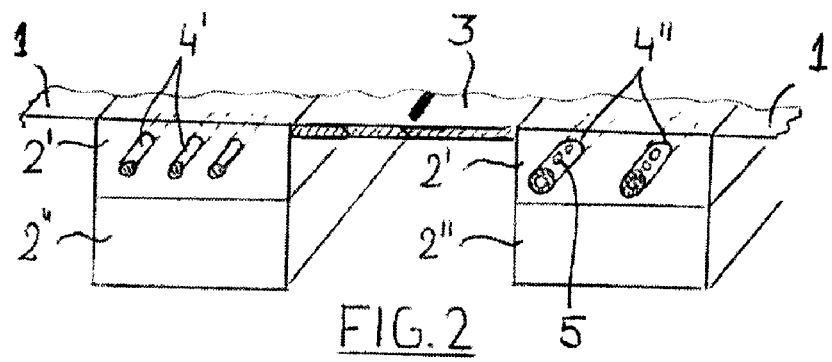
FIG. 2 is a schematic perspective view of a runway with another embodiment of a sound reducing apparatus disposed adjacent thereto.

In one embodiment, the top layer 2 is part of an assembly comprising at least two superimposed layers with different density and/or different speed of sound and/or different thickness (FIG. 2: superimposed layers 2' and 2"). As a result the transmission of low frequency sound through the layers 2', 2" in the ground below the ground surface may be optimized in the manner of a low frequency sound filter.

The absorption of the sound propagating in the ground may be enhanced further when, in accordance with yet another embodiment of the present method, the assembly of at least two superimposed layers 2', 2" is designed to create a mass-spring system.

Other measures resulting in such an improved absorption are provided by methods wherein the assembly of at least two superimposed layers 2', 2" provides a mode coupling to secondary waves (i.e. particles moving perpendicularly to the direction of sound propagation) and/or primary waves (i.e. seismic waves, longitudinal sound propagation) and/or Rayleigh waves (i.e. rotation of particles) and/or Love waves below the ground surface.

Figure 3:
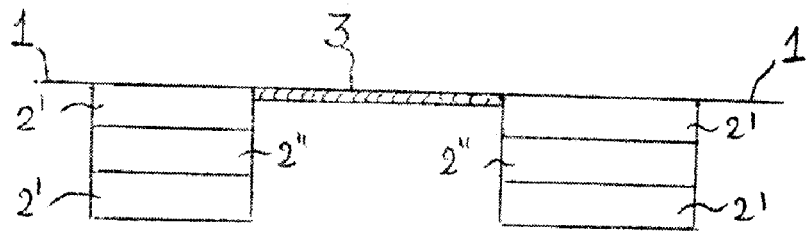
FIG. 3 is a schematic sectional view of a runway with another embodiment of a sound reducing apparatus disposed adjacent thereto.

In a practical embodiment of the method, the assembly of superimposed layers 2', 2" comprises at least three superimposed layers 2', 2" with an alternation of two different layer types. That means that successive horizontal layers are created in which all odd layers are of the same type, as are the even layers (FIG. 3: embodiment with two odd layer 2' and one even layer 2").

It is noted that 'of the same type' does not necessarily mean that such layers 2', 2" have the same dimensions (especially thickness), but it merely tries to express that such layers 2', 2" are constituted of the same (or equivalent) materials.

For example it is possible that the assembly comprises alternating layers 2', 2" of sand and polystyrene foam. Such layers 2', 2" may be designed for an optimal angle of incidence of the sound and frequency concerned, and even for multiple sounds and multiple frequencies. Depending on the density and the speed of sound in the layers 2', 2" the assembly can be optimized for the absorption of the fore mentioned low frequency noise.

As a further possibility to improve the method, the effective acoustic impedance of the layer 2 or layers 2', 2" in the ground is matched for the incident sound wave properties, such as for example frequencies, direction of sound propagation, depending on the type of layer(s) 2, 2', 2" in the ground.

When, in accordance with another embodiment of the method, each layer 2, 2', 2" below the ground is oriented in a direction perpendicular to the maximum intensity of the sound, the sound wave will contact the ground most effectively regarding the air to ground coupling.

According to another embodiment of the present method, below the ground further a grid structure is provided for scattering the sound (indicated schematically as grid 4 in FIG. 1). Such a grid 4, for example, may comprise bars (bars 4' in FIG. 2). The bars 4 may be optimized by dimension and distance from each other. Also the density and speed of sound in the bars and in the surrounding ground may be optimized with respect to the scattering of sound.

As an example, in addition to the layered structures, cylindrical structures with air inside (shown as 4" in FIG. 2) can be located just below the ground surface. When excited by pressure fluctuations of the low frequency sound at the right acoustical modes, these structures are able to absorb acoustical energy. This absorption can be achieved by transfer of acoustic energy to vibration energy and heat in the pipes which are located below the surface. The vibration energy will be absorbed by the surrounding ground. Care should be taken to keep water out of these pipes. The sound absorption of the pipes can be increased by making holes in the pipe which face the air (holes 5 in FIG. 2). These holes 5 will actuate the modes of the pipe 4" more efficiently by the pressure changes of the sound impinging onto the pipe 4" in the ground.

In a practical embodiment, meant for the reduction of aircraft sounds, especially in the range of 15 Hz to 40 Hz, during the first part of take-off, said layer(s) below the ground are provided in a range (distance A in FIG. 1) starting at the lateral side of the runway 3 and extending until at least 100 meters from the runway 3. The range can vary depending on the required noise reduction in a specific situation.

The effectiveness of such a method is further improved when said range extends until a distance of at least 300 meters from the runway 3, and more preferably when said range extends until a distance of at least 500 meters from the runway 3.

Figure 1:
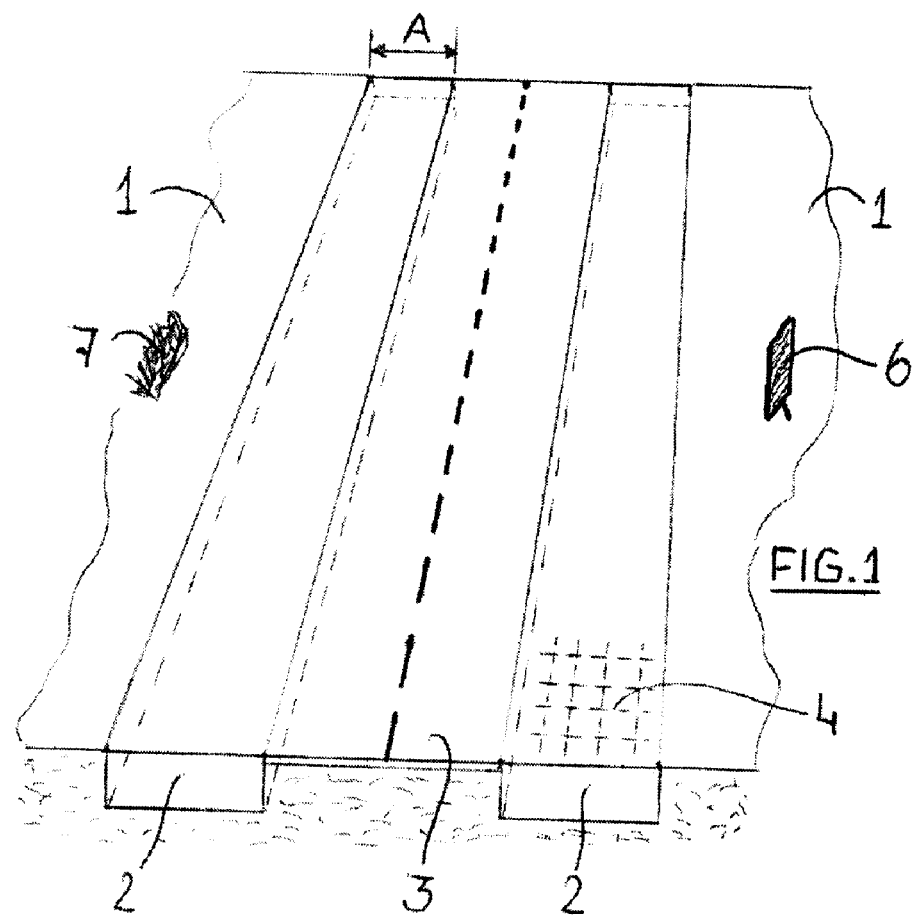
FIG. 1 is a schematic perspective view of a portion of a runway with a sound reducing apparatus disposed adjacent thereto.

It is noted that the present method for reducing sound travelling in a so-called wave-guide may be combined with known methods of absorbing sound by means of, for example, sound absorbing structures (e.g. shields—see FIG. 1, shields 6—) or vegetation—see vegetation 7 in FIG. 1—(which structures, when used in the context of reducing air-craft noise can be positioned at a larger distance from the runway such as not to create any safety risk). The sound reduction achievable with the method in accordance with the invention may be considerable (up to 6 dB and more).

Further it is noted that the method in accordance with another embodiment also may be applied in other situations, such as on aircraft carriers or at locations where reduction of high intensity and/or low-frequency noise sources is required.

The invention is not limited to the embodiments described above which may be varied widely within the scope of the invention as defined by the appending claims.

What is claimed is:

1. A method for reduction of sound travelling in a waveguide in air above ground or a support, the method comprising:

providing a structure comprising at least two superimposed layers with at least one of a different density, a different speed of sound and a different thickness and the at least two superimposed layers including a top layer which is not the air; and positioning the structure in or on the ground or the support with the top layer facing upwardly to form an interface between the structure and the air and where an acoustic impedance at the top layer substantially matches an acoustic impedance of the air to provide an acoustic impedance match at the interface between the structure and the air.

2. The method according to claim 1, wherein water is excluded as much as possible from the top layer.

3. The method according to claim 1, wherein the at least two superimposed layers are configured as a mass-spring system.

4. The method according to claim 1, wherein providing the structure includes providing an interface between the at least two superimposed layers that is oriented parallel to the interface of the structure with the air.

5. The method according to claim 1 wherein the structure comprises alternating layers of sand and polystyrene foam.

6. The method according to claim 1, further comprising providing a grid structure for at least one of scattering and absorbing sound.

7. The method according to claim 6, wherein the grid structure includes elongate structures embedded in one of the at least two superimposed layers.

8. The method according to claim 7, wherein the elongate structures comprise cylindrical structures.

9. The method according to claim 8, wherein the cylindrical structures are formed of tubular bodies having an inner channel and the tubular bodies include a plurality of spaced holes facing the air along a length of the tubular bodies.

10. The method according to claim 1, wherein positioning includes positioning the structure along lateral sides of a runway.

11. An apparatus for reduction of sound travelling in a wave-guide in air above ground or a support, the apparatus comprising:
a structure comprising at least two superimposed layers with at least one of a different density, a different speed of sound and a different thickness, and wherein the at least two superimposed layers comprise a top layer which is not the air and forms an interface between the structure and the air where an acoustic impedance at the top layer substantially matches an acoustic impedance of the air to provide an acoustic impedance match at the interface between the structure and the air.

12. The apparatus according to claim 11, wherein the structure further comprises a grid structure.

13. The apparatus according to claim 12, wherein the grid structure comprises elongate structures embedded in the structure.

14. The apparatus according to claim 13, wherein the elongate structures comprise tubular bodies having an inner channel.

15. The apparatus according to claim 14, wherein the tubular bodies have a plurality of spaced holes opened to the inner channel and facing the air.

16. The apparatus of claim 12 wherein the grid structure is embedded in the top layer.

17. The apparatus of claim 12 wherein the grid structure includes a plurality of spaced elongate structures extending cross-wise relative to a width of the structure and a plurality of spaced elongate structures extending length-wise relative to a length of the structure.

18. The apparatus of claim 11 wherein the top layer has a generally planar top surface which forms a generally planar interface between the air and the structure.

19. The apparatus of claim 11 wherein the top layer includes a length, width and thickness dimension and wherein the thickness dimension of the top layer is constant along the entire length and the entire width of the top layer.

20. The apparatus of claim 11 wherein the at least two superimposed layers coextend along an entire length and entire width of the structure.

21. The apparatus of claim 11 wherein the at least two superimposed layers have a length and width dimension orientated parallel to the ground or the support.

22. The apparatus of claim 11 wherein the structure comprises at least three layers including a lower layer and an intermediate layer disposed between the top layer and the lower layer and wherein the intermediate layer is formed of a different material than the top layer and the lower layer.

23. The apparatus of claim 22 wherein the top layer and lower layer are formed of the same material.

24. The apparatus of claim 11 wherein the at least two superimposed layers of the structure comprises a sand layer and polystyrene foam layer.

25. In combination with a runway, an apparatus for reduction of sound travelling in a wave-guide in air above ground, the apparatus comprising:
a multiple layered structure comprising a top layer separate from the air forming an interface between the structure and the air with an acoustic impedance of the top layer substantially matching an acoustic impedance of the air, to provide an acoustic impedance match at the interface of the structure and the air.

* * * * *